US010108960B2

(12) United States Patent
Song

(10) Patent No.: US 10,108,960 B2
(45) Date of Patent: Oct. 23, 2018

(54) METHOD OF COMPLETING PAYMENT THROUGH CLIENTS, RELATED DEVICES AND A PAYMENT SYSTEM

(71) Applicant: Tencent Technology (Shenzhen) Co., Ltd., Shenzhen (CN)

(72) Inventor: Zhigang Song, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 422 days.

(21) Appl. No.: 14/622,307

(22) Filed: Feb. 13, 2015

(65) Prior Publication Data

US 2015/0154603 A1    Jun. 4, 2015

Related U.S. Application Data

(63) Continuation of application No. PCT/CN2014/080514, filed on Jun. 23, 2014.

(30) Foreign Application Priority Data

Nov. 19, 2013    (CN) .................... 2013 1 05856663

(51) Int. Cl.
   G06Q 20/40    (2012.01)
   G06Q 20/32    (2012.01)
(52) U.S. Cl.
   CPC ... G06Q 20/40145 (2013.01); G06Q 20/3272 (2013.01)
(58) Field of Classification Search
   CPC .................................................. G06Q 20/40
   (Continued)

(56) References Cited

U.S. PATENT DOCUMENTS 6,181,693 B1*   1/2001  Maresca ............ H04N 21/6137
                                                   348/423.1
2007/0106735 A1*  5/2007  Hardy, Jr. ............. G06F 21/606
                                                       709/206
(Continued)

FOREIGN PATENT DOCUMENTS

CN    101419726 A    4/2009
CN    102419847 A    4/2012
(Continued)

OTHER PUBLICATIONS

Y.A. Au, R.J. Kauffman, The economics of mobile payments: Understanding stakeholder ..., Electron. Comm. Res. Appl. (2007), doi:10.1016/j.elerap.2006.12.004.*

(Continued)

*Primary Examiner* — Asha Puttaiah
*Assistant Examiner* — Tony P Kanaan
(74) *Attorney, Agent, or Firm* — Brinks Gilson & Lione

(57) ABSTRACT

A method, device and system of completing payment through clients are disclosed. The method includes a first client being a payee and a second client being a payer. The first client performs audio encoding on: a first client identifier and obtained pending payment charge indication information in order to obtain a computed payment charge voice message, subsequently broadcasts the computed payment charge voice message. The second client performs: monitoring the computed payment charge voice message subsequently decodes the computed payment charge voice message to extract the first identifier and the pending payment charge indication information; generates a payment request and sends to a server the payment request including the first identifier, the pending payment charge indication information and payer information. The server: initiates a payment transaction process to complete funds transfer between a (Continued)

payer account corresponding to the payer information and a payee account corresponding to the first client identifier.

14 Claims, 6 Drawing Sheets

(58) Field of Classification Search
USPC .......................................................... 705/44
See application file for complete search history.

(56) References Cited

U.S. PATENT DOCUMENTS

| | | | | |
|---|---|---|---|---|
| 2007/0136200 | A1* | 6/2007 | Frank ..................... | G06Q 10/10 705/50 |
| 2008/0294556 | A1* | 11/2008 | Anderson ............... | G06Q 20/40 705/44 |
| 2009/0049119 | A1* | 2/2009 | Marcinkiewicz ........ | H04L 67/06 709/203 |
| 2012/0089509 | A1* | 4/2012 | Kasriel ................ | G06Q 20/102 705/40 |
| 2013/0262659 | A1* | 10/2013 | Parthasarathy ..... | H04L 41/5083 709/224 |
| 2015/0310510 | A1* | 10/2015 | Kelly ..................... | G07B 13/00 705/13 |

FOREIGN PATENT DOCUMENTS

| | | | | |
|---|---|---|---|---|
| CN | 102509216 | A | * 6/2012 | ............. G06Q 20/16 |
| CN | 102722812 | A | 10/2012 | |
| CN | 102761580 | A | 10/2012 | |
| CN | 102971758 | A | 3/2013 | |
| CN | 103246977 | A | 8/2013 | |
| CN | TW201346800 | A | 11/2013 | |
| CN | 103761648 | A | 4/2014 | |
| CN | 103810763 | A | 5/2014 | |
| CN | 103813263 | A | 5/2014 | |
| WO | WO2013038416 | A1 | 3/2013 | |

OTHER PUBLICATIONS

International Search Report received in PCT Application No. PCT/CN2014/080514 dated Sep. 30, 2014.
First Taiwanese Office Action dated Nov. 9, 2015.
Office Action dated Jul. 5, 2016 for Chinese Application No. 102509216 A, 10 pages.

* cited by examiner

METHOD OF COMPLETING PAYMENT THROUGH CLIENTS, RELATED DEVICES AND A PAYMENT SYSTEM

CROSS-REFERENCE TO RELATED APPLICATIONS

The application is a continuation of PCT Application No. PCT/CN2014/080514, filed on Jun. 23, 2014, which priority to Chinese Patent Application No. 2013105856663, filed on Nov. 19, 2013, which is incorporated by reference in their entireties.

FIELD OF THE TECHNOLOGY

The present invention relates to the technical field of payment using computers or smart communication devices, and more specifically to a method of completing payment through clients, related devices, and a payment system.

BACKGROUND

In the modern society, there exist a number of payment scenarios, including Internet-based payment, completion of transactions in cash, and completion of transactions using bank cards. Internet-based payment has been adopted by more and more users and merchants thanks to its simple implementation, quick operation, and high security and reliability.

In contrast, payment in cash or by a bank card requires the users to carry cash or a bank card. In a scenario where payment needs to be made in cash, such as taking a metro train, a self-service ticketing bus, or a taxi, an exact amount including small changes may be necessary. This requirement may cause inconveniences to the user. In another scenario using a bank card for payment, the payee (e.g., merchant) may need to install a point of sale (POS) machine which may increase additional transaction cost. In addition, payment by bank card may yet to be implemented in some scenarios such as taking subway, a self-service ticketing bus, or a taxi.

SUMMARY

To solve the above described technical problems, the present disclosure provides a method of completing payment through clients, related devices, and a payment system for completing transaction payments through clients conveniently, quickly and reliably.

All the embodiments disclose that the clients to include at least a first client being a payee who receives payment and a second client being a payer who makes the payment.

An embodiment of the disclosure discloses a method of completing payment through clients, wherein: the method may include the following exemplary operations: performing audio encoding by the first client on: a first client identifier and obtained pending payment charge indication information in order to obtain a computed payment charge voice message, and subsequently broadcasting the computed payment charge voice message; monitoring by the second client, the computed payment charge voice message, and subsequently decoding the computed payment charge voice message in order to extract the first identifier and the pending payment charge indication information; generating by the second client, a payment request and sending the payment request to a server, wherein the payment request may include the first identifier, the pending payment charge indication information and payer information; and initiating by the server in response to the received payment request, a payment transaction process in order to complete funds transfer between a payer account corresponding to the payer information and a payee account corresponding to the first client identifier.

Another embodiment of the disclosure provides a method of completing payment through clients, wherein the method may include the following exemplary operations: obtaining by a first client, a payment charge indication information; performing by the first client, audio encoding of the obtained payment charge indication information and a preset first client identifier to obtain a computed payment charge voice message; and broadcasting by the first client, the computed payment charge voice message to a second client so that the second client sending a payment request to a server based on the computed payment charge voice message in order to complete a funds transfer.

Another embodiment of the disclosure provides a method of completing payment through clients, wherein the method may include the following exemplary operations: monitoring by a second client, a computed payment charge voice message generated and broadcasted by the first client based on a payment charge indication information and a first client identifier obtained by the first client; decoding by the second client, the computed payment charge voice message to obtain the pending payment charge indication information and the first client identifier; and generating by the second client, a payment request containing the pending payment charge indication information, the first client identifier, and the payer information, and sending the request to a server in order that the server initiating a payment transaction process in order to complete a funds transfer between a payer account corresponding to the payer information and a payee account corresponding to the first client identifier.

Another embodiment of the disclosure provides a payment device for use between at least a first client and a second client, the first client being a payee who receives payment and the second client being a payer who makes the payment, the payment device may include: at least a processor operating in conjunction with at least a memory which stores instruction codes operable as plurality of modules, wherein the plurality of modules may include: a read module, which obtains payment charge indication information; an encode module, which performs audio encoding on: the obtained payment charge indication information and a preset first client identifier which identifies the first client, in order to obtain a computed payment charge voice message; and a broadcast module, which broadcasts the computed payment charge voice message to the second client so that the second client sends a payment request to a server based on the computed payment charge voice message to complete funds transfer.

Another embodiment of the disclosure provides a payment device for use between at least a first client and a second client, the first client being a payee who receives payment and the second client being a payer who makes the payment, the payment device may include: at least a processor operating in conjunction with at least a memory which stores instruction codes operable as plurality of modules, wherein the plurality of modules may include: a monitor module, which monitors a computed payment charge voice message generated by the first client based on a payment charge indication information and a first client identifier, in order to obtain a computed payment charge voice message which is to be broadcasted by the first client; a decode module, which decodes the computed payment charge voice message in order to obtain the payment charge indication information and the first client identifier; and a request module, which generates a payment request containing the pending payment charge indication information, the first client identifier, and a payer information, and afterwards, sends the payment request to a server in order that the server initiates a payment transaction process to complete the funds transfer between a payer account corresponding to the payer information and a payee account corresponding to the first client identifier.

Another embodiment of the disclosure provides a non-transitory computer readable storage medium, wherein the computer readable storage medium stores a program which comprises codes or instructions to cause a machine to execute payment through clients operations, wherein: the clients include at least a first client being a payee who receives payment and a second client being a payer who makes the payment, the exemplary operations include: obtaining by a first client, a payment charge indication information; performing by the first client, audio encoding of the obtained payment charge indication information and a preset first client identifier to obtain a computed payment charge voice message; and broadcasting by the first client, the computed payment charge voice message to a second client so that the second client sending a payment request to a server based on the computed payment charge voice message in order to complete a funds transfer.

Another embodiment of the disclosure provides a non-transitory computer readable storage medium, wherein the computer readable storage medium stores a program which comprises codes or instructions to cause a machine to execute payment through clients operations, wherein: the clients include at least a first client being a payee who receives payment and a second client being a payer who makes the payment, the exemplary operations include: monitoring by a second client, a computed payment charge voice message generated and broadcasted by the first client based on a payment charge indication information and a first client identifier obtained by the first client; decoding by the second client, the computed payment charge voice message to obtain the pending payment charge indication information and the first client identifier; and generating by the second client, a payment request containing the pending payment charge indication information, the first client identifier, and the payer information, and sending the request to a server in order that the server initiating a payment transaction process in order to complete a funds transfer between a payer account corresponding to the payer information and a payee account corresponding to the first client identifier.

Another embodiment of the disclosure provides a payment system, which includes at least a first client being a payee who receives payment, a second client being a payer who makes the payment and a server, wherein: the first client performs audio encoding on: both obtained pending payment charge indication information and a first client identifier in order to obtain a computed payment charge voice message, and broadcasts the computed payment charge voice message; the second client monitors the computed payment charge voice message and decodes the computed payment charge voice message in order to obtain the pending payment charge indication information and the first client identifier; the second client further generates a payment request which contains the pending payment charge indication information, the first client identifier and payer information, and sends the payment request to the server; and the server, in response to the received payment request, initiates a payment transaction process in order to complete funds transfer between a payer account corresponding to the payer information and a payee account corresponding to the first client identifier.

Using clients' supporting audio broadcasting and audio recording to perform payment charge transactions on devices such as mobile phones carried by the payer and payee, to enable bill payment transactions be conveniently, quickly, reliably and accurately performed between the payment receiving side and the paying side at low costs.

BRIEF DESCRIPTION OF THE DRAWINGS

The accompanying drawings are included to provide a further understanding of the claims and disclosure, are incorporated in, and constitute a part of this specification. The detailed description and illustrated embodiments described serve to explain the principles defined by the claims.

DETAILED DESCRIPTION OF THE EMBODIMENTS

The various embodiments of the present disclosure are further described in details in combination with attached drawings and embodiments below. It should be understood that the specific embodiments described here are used only to explain the present disclosure, and are not used to limit the present disclosure. In addition, for the sake of keeping description brief and concise, the newly added features, or features that are different from those previously described in each new embodiment will be described in details. Similar features may be referenced back to the prior descriptions in a prior numbered drawing or referenced ahead to a higher numbered drawing.

In order to clarify the object, technical scheme and advantages of the present disclosure more specifically, the present disclosure is illustrated in further details with the accompanied drawings and embodiments. It should be understood that the embodiments described herein are merely examples to illustrate the present disclosure, but not to limit the present disclosure.

Figure 1:
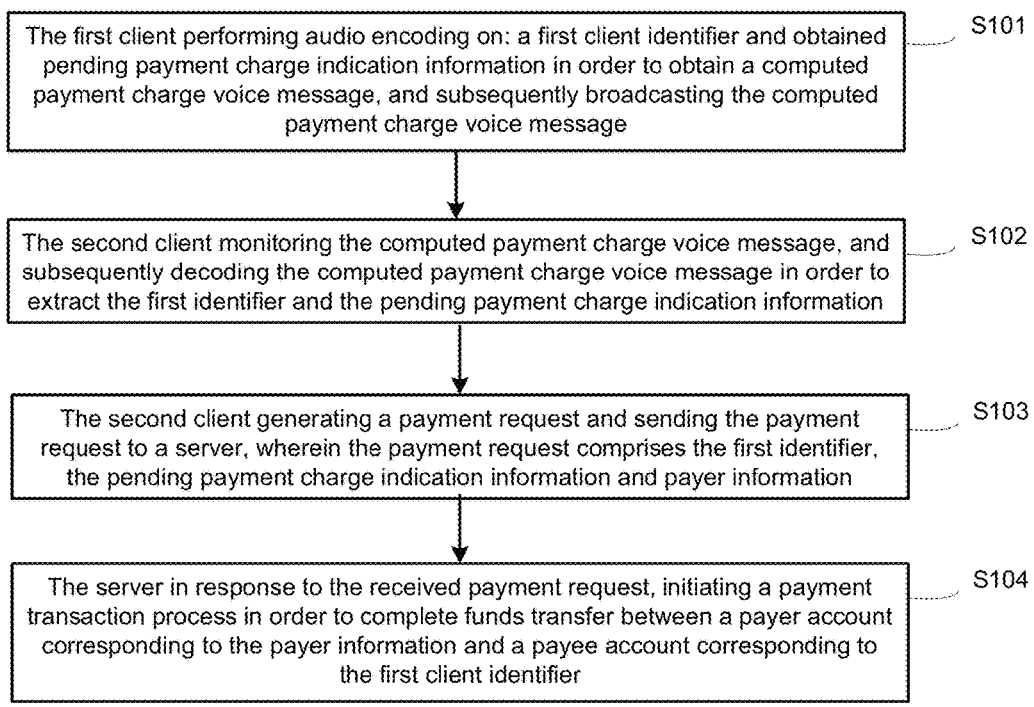
FIG. 1 depicts a flowchart of an exemplary method for completing payment through clients, according to an embodiment of the disclosure.

FIG. 1 depicts a flowchart of an exemplary method for completing payment through clients, according to an embodiment of the disclosure. More specifically, the method implements interactions at least among a first client who receives payment (i.e., a payee or a billing user terminal), a second client who makes the payment (i.e., a payer terminal), and a server (which processes funds transfer transaction between the first and the second clients). The method may include at least the following exemplary operations:

S101: A first client performing audio encoding on: a first client identifier and obtained pending payment charge indication information in order to obtain a computed payment charge voice message, and subsequently broadcasting the computed payment charge voice message.

In an embodiment of the disclosure, the pending payment charge indication information may be billing information read from a billing device, for example, a taximeter a cash register connected to a network, or a billing identifier which is sent to the server to uniquely identify payment charge information on the server after the payment charge information has been read from the billing device.

In implementation, the first client may be a PC, a smart mobile terminal, for example, a smartphone and a tablet PC, a vehicle-mounted terminal, and any other terminal that may generate a bill or payment charge information for charging a second client based on services rendered or purchases made by the second client. After the payment charge information has been generated, the first client may encode the payment charge information and broadcast such information via audio formats.

Furthermore in the S101 operation, the first client may be configured with an installed billing program which may obtain pending payment charge indication information. For example, the pending payment charge indication information may be obtained according to an itemized list, which may include names of services rendered or goods purchased, unit price, and quantities, which are generated by the installed billing program. Alternately, the pending payment charge indication information may be obtained through barcodes scanning from a scanner, or via calculated fare read out from a fare meter of a taxi or a bus, to name a few. In brief, the payment charge indication information may be read from various existing billing devices through an interface provided by an application, such as a preconfigured billing program installed on the first client.

After obtaining the pending payment charge indication information, the first client, according to the preset encoding/decoding rules, performs audio encoding of the obtained pending payment charge indication information and the preset first client identifier that is used to uniquely identify the first client, and obtains a computed payment charge voice message. Upon completion of the encoding, the first client may invoke the audio broadcast module to broadcast the computed payment charge voice message obtained through encoding.

S102: The second client monitors the computed payment charge voice message, and subsequently decoding the computed payment charge voice message in order to extract the first identifier and the pending payment charge indication information.

The second client may be a smart mobile terminal with network connection capabilities, such as a smartphone, a tablet PC, and a smart wearable device. After the voice-enabled payment function is enabled, the second client may invoke the pickup module of the terminal to monitor and record the computed payment charge voice message broadcasted by the first client.

After recording the computed payment charge voice message, the second client, according to the encoding/decoding rules (which are the same as those adopted by the first client) decodes the computed payment charge voice message to restore the pending payment charge indication information and the first client identifier.

It should be pointed out that when the first client encodes the pending payment charge indication information and the first client identifier, a start flag and an end flag may be set in the encoding/decoding rules and a specific data format may be negotiated. The encoding may allow the second client to accurately obtain the pending payment charge indication information and the first client identifier which are contained in the computed payment charge voice message according to the start flag, the end flag, and the data format.

S103: The second client may generate and send a payment request which contains the pending payment charge indication information, the first client identifier, and the payer information to the server. It may be assumed that the second client may have obtained an order of this payment transaction once the pending payment charge indication information and the first client identifier have been obtained. The first client identifier may be a payee identifier, and according to the first client identifier, information about the payee account corresponding to the identifier may be obtained.

The payer information may be one of: a user account, such as a bank credit card number, an Internet transaction account, and even a mobile number that may be used to complete Internet-based payment and that is bound to the payer who initiates the purchase (namely, the user of the second client). In addition, the payer information may further include a password for a corresponding user account, which enables the server to directly authenticate whether the user is legal. Of course, the payer information may also be merely a user account. Based on the user account, the server initiates the flow from user authentication up to completion of the funds transfer.

S104: The server may, in response to the received payment request, initiating a payment transaction process in order to complete the funds transfer between a payer account corresponding to the payer information and a payee account corresponding to the first client identifier.

The server may be a communication server which may facilitate communications between the first client and the second client. Upon receiving a payment request from the second client, the server may base on an account type specified in the payer information contained in the payment request, send a payment request to preset transaction servers corresponding to the account type. Based on the pending payment charge indication information, the first client identifier, and the payer information contained in the payment request, these transaction servers may obtain an order, complete the existing transaction payment according to the order. Upon completion of the funds transaction, the server may return a transaction success or failure notification to the server.

In another embodiment, the server may be an integrated server that may implement payment for a transaction. The server directly performs the current funds transfer between a payer account corresponding to the payer information and a payee account corresponding to the first client identifier. Specifically, after obtaining the payer information (payer information), payee information (first client identifier), and related payment charge indication information, the server may complete the funds transfer between the accounts based on an existing funds transfer flow.

Note that, if the pending payment charge indication information contained in the payment request may be bill information, the server may directly initiate the funds transfer between the payee and the payer based on the bill information; if the pending payment charge indication information contained in the payment request is a billing identifier, the server may need to search for the corresponding payment charge information based on the generated billing identifier and afterwards, completing the funds transfer between the payee and the payer based on the payment charge information found.

Using clients supporting audio broadcasting and audio recording, such as the mobiles carried by the payer and payee, the embodiments disclosed may facilitate and complete payment of bills between the receiving side and the paying side conveniently, swiftly, and at low costs.

Figure 2:
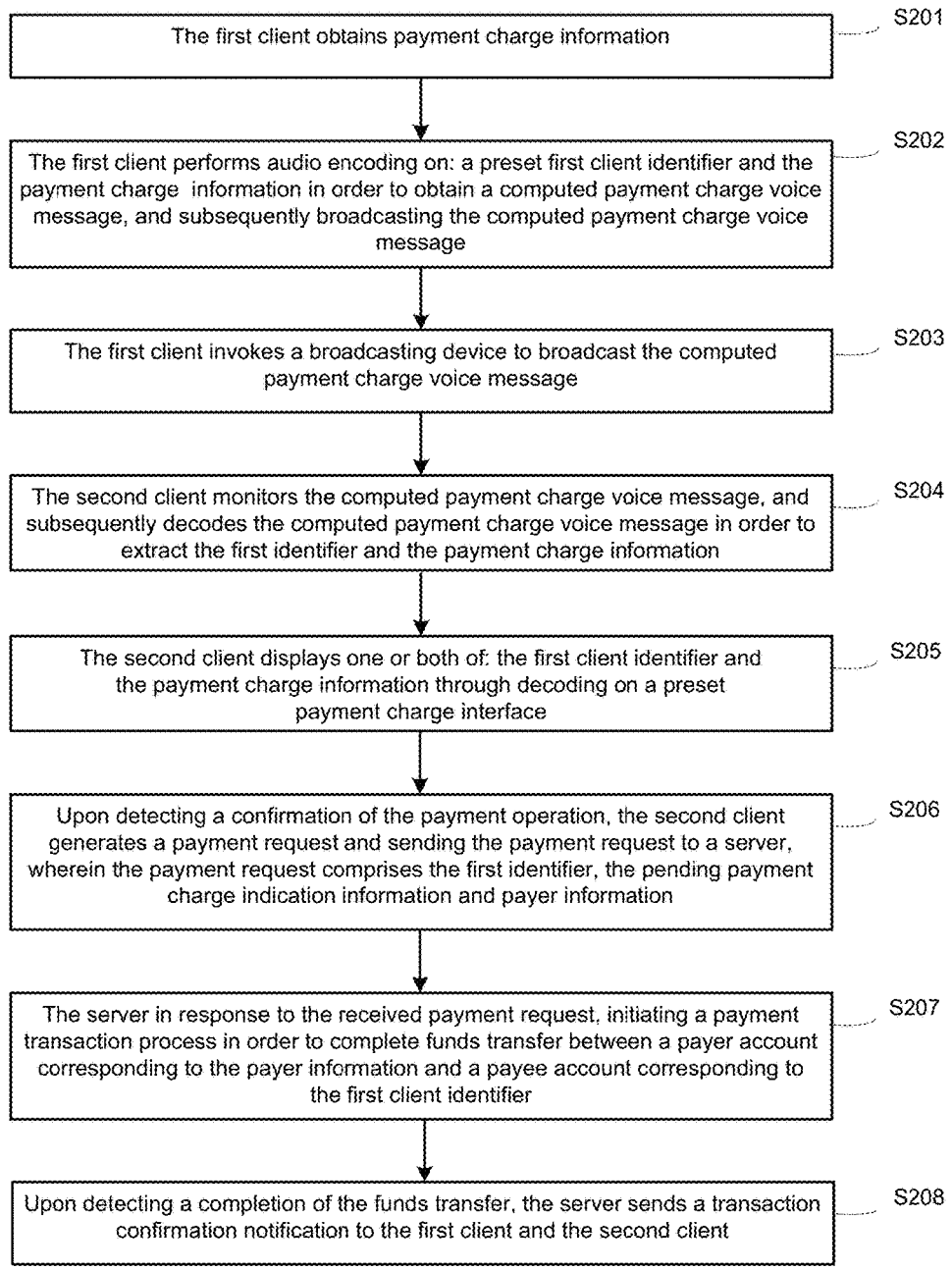
FIG. 2 depicts a flowchart of an exemplary method for completing payment through clients, according to another embodiment of the disclosure.

FIG. 2 depicts a flowchart of an exemplary method for completing payment through clients, according to another embodiment of the disclosure. The method may include at least the following operations:

S201: The first client obtains payment charge indication information. The payment charge indication information may be obtained through the first client reading payment charge information from a billing device. The first client may send the obtained payment charge information to the server, and receives from the server a generated billing identifier based on the bill information. The first client may then use the generated billing identifier as the pending payment charge indication information.

The billing device may be a billing module built within the first client or as an external billing module. As described in FIG. 1, the billing device may be a taximeter, a cash register computer, and a billing device in a bus, through which the first client may read corresponding payment charge indication information through information exchange.

Upon receiving the payment charge information sent by the first client, the server may assign a unique billing identifier to associate with the payment charge information and store the payment charge information with its associated billing identifier.

S202: The first client performs the audio encoding on: a preset first client identifier and the payment charge information (which may be used as pending payment charge indication information) in order to obtain a computed payment charge voice message, and subsequently broadcasting the computed payment charge voice message.

Alternately, the first client may use the generated billing identifier (from S201) as the pending payment charge indication information, and performs audio encoding of the generated billing identifier (which is being used as the pending payment charge indication information) and the first client identifier (which has been preset), in order to obtain the computed payment charge voice message.

S203: The first client invokes a broadcasting device to broadcast the computed payment charge voice message. Upon completion of encoding of the computed payment charge voice message, the first client may invoke an audio broadcast module to broadcast the encoded computed payment charge voice message.

S204: The second client monitors the computed payment charge voice message, and subsequently decodes the computed payment charge voice message in order to extract the first client identifier and the pending payment charge indication information. In an embodiment, the second client may be a smart mobile terminal with networking capabilities, for example, a smartphone, tablet PC, and smart wearable device. After the voice-enabled payment function is enabled, the second client may invoke a pickup module of the smart mobile terminal to monitor and record the computed payment charge voice message broadcasted by the first client.

After recording the computed payment charge voice message, the second client may decode (according to the same encoding/decoding rules as those adopted by the first client) the computed payment charge voice message to restore the pending payment charge indication information (or the billing identifier) and the first client identifier.

It should be pointed out that when the first client encodes the pending payment charge indication information and the first client identifier, a start flag and an end flag may be set in the encoding/decoding rules and a specific data format may be negotiated. This may allow the second client to accurately obtain the pending payment charge indication information and the first client identifier contained in the computed payment charge voice message according to the start flag, the end flag, and the data format.

S205: The second client displays one or both of: the first client identifier and the pending payment charge indication information through decoding on a preset payment charge interface.

After obtaining the corresponding payment charge indication information and the first client identifier obtained through decoding, the second client may display the pending payment charge indication information and the first client identifier, then requesting the user to confirm whether the displayed information is correct and whether the existing transaction payment should proceed.

If it has been detected confirmation of payment operation, the second client may initiate the payment transaction process. Otherwise, the second client may directly delete the recorded payment voice message and the pending payment charge indication information and the first client identifier.

S206: Upon detecting a confirmation of the payment operation, the second client generates a payment request and sending the payment request to a server, wherein the payment request comprises the first identifier, the pending payment charge indication information and payer information.

The second client may be considered to have obtained the order for the current payment transaction once it obtains the pending payment charge indication information and the first client identifier. The first client identifier may be the payee identifier, and information about the account of the payee may correspond to the first client identifier. The payer information may be a user account, for example, a bank card number, an Internet transaction account, or simply a mobile number that may be used to complete an Internet-based payment on the purchase made by the second client (i.e., payer).

In addition, the payer information may further include a password for a corresponding user or payer's account, thus allowing the server to directly authenticate whether the user or payer may be legitimate. Of course, the payer information may also be merely a user account. Based on the user or payer's account, the server may initiate a flow from user authentication up to completion of the funds transfer.

S207: The server in response to the received payment request, initiating a payment transaction process in order to complete funds transfer between a payer account corresponding to the payer information and a payee account corresponding to the first client identifier.

The server may be a communication server which facilitates communication between the first client and the second client. Upon receiving a payment request from the second client, the server, based on the account type specified in the payer information contained in the payment request, may send the payment request to respective preset transaction servers corresponding to the account type. Based on the pending payment charge indication information, the first client identifier, and the payer information contained in the payment request, these respective transaction servers may obtain an order to complete an existing transaction payment and return a transaction success or failure notification to the server upon transaction completion.

In another embodiment, the server may be an integrated server that may directly handle transaction payment. The server may directly perform the current funds transfer from the paying account corresponding to the payer information to the receiving account corresponding to the first client identifier.

If the pending payment charge indication information contained in the received payment request is a billing identifier, the server may respond to the payment request and initiate the payment transaction process. The server may obtain the generated billing identifier based on the pending payment charge indication information contained in the payment request; search for the payment charge information which is associated and stored with the billing identifier. The server may initiate the payment transaction process based on the payment charge information found, the first client identifier and the payer information contained in the payment request. The server may store the payment charge information and the generated billing identifier to facilitate mapping searches.

S208: Upon detecting a completion of the funds transfer, the server sends a transaction confirmation notification to the first client and the second client. After completing the funds transfer, the server may also store the first client identifier, the pending payment charge indication information, and the payer information to allow viewing of the information about this payment.

Upon receiving a query request that is based on the payer information, the server may search for the terminal (i.e., the second client) which sends the query request, and may return the first client identifier and the pending payment charge indication information to the terminal (i.e., the second client).

Optionally, the server may upon receiving an invoice printing request based on the payer information from an invoice printing device, query the corresponding payment charge indication information and the first client identifier based on the payer information contained in the invoice printing request, and then return an invoice data message to the printing device which sends the invoice printing request to print the corresponding invoice.

Figure 3:
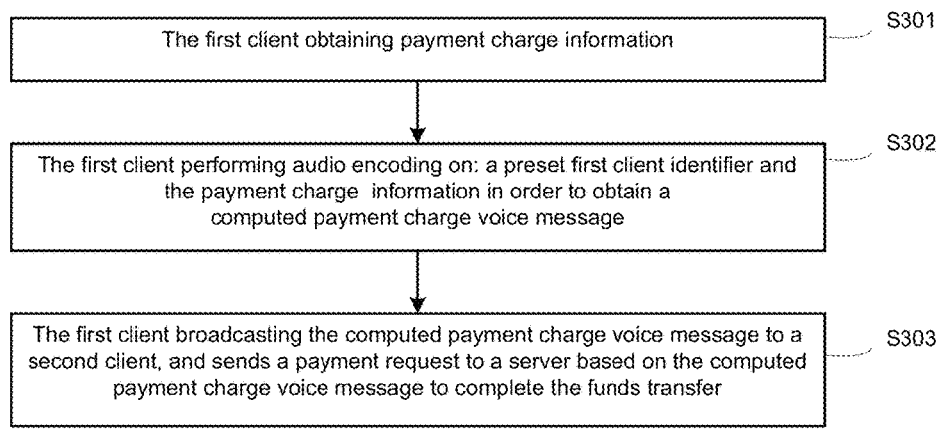
FIG. 3 depicts a flowchart of an exemplary method for completing payment through clients, according to another embodiment of the disclosure.

FIG. 3 depicts a flowchart of an exemplary method for completing payment through clients, according to another embodiment of the disclosure. More specifically, FIG. 3 illustrates an implementation of the method by the first client. The method, may be implemented using a PC, a smart mobile terminal, a smartphone and a tablet PC, a vehicle-mounted terminal, or any terminal that may bill a user based on services rendered or purchases made by audio encoding, and broadcasting the encoded audios from a first client to a second client. The method may include the following exemplary operations:

S301: The first client obtaining payment charge indication information. This operation is similar to S201 in FIG. 2, and will not be repeated again.

S302: The first client performing audio encoding on: a preset first client identifier and the payment charge indication information in order to obtain a computed payment charge voice message. The first client may perform the audio encoding on: the first client identifier (which has been preset) and the payment charge information (which is being used as payment charge indication information) in order to obtain the computed payment charge voice message. Alternatively, the first client may use the generated billing identifier as payment charge indication information, and perform audio encoding on: the first client identifier which has been preset and the generated billing identifier (which is being used as payment charge indication information) in order to obtain the computed payment charge voice message.

S303: The first client broadcasting the computed payment charge voice message to a second client, and sends a payment request to a server based on the computed payment charge voice message to complete the funds transfer. Upon encoding completion, the first client may invoke the audio broadcast module to broadcast the computed payment charge voice message obtained through encoding. Further details may be referred to the embodiments in FIG. 1 (see S101) and FIG. 2 (see S203)

Figure 4:
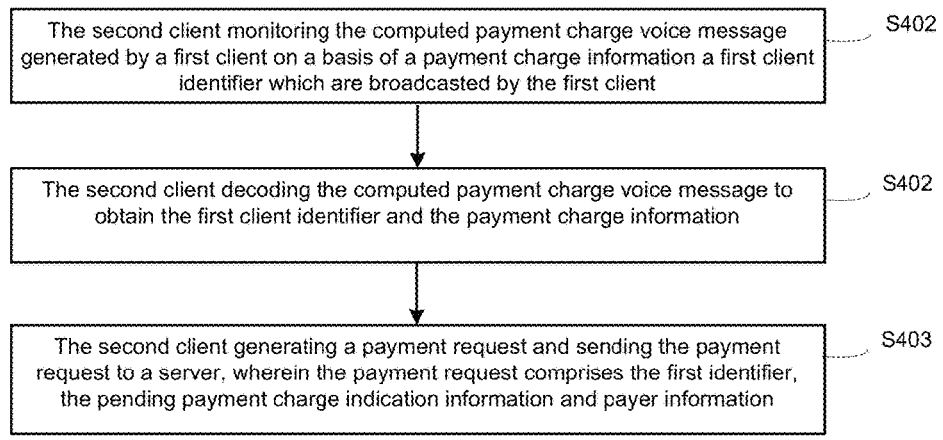
FIG. 4 depicts a flowchart of an exemplary method for completing payment through clients, according to another embodiment of the disclosure.

FIG. 4 depicts a flowchart of an exemplary method for completing payment through clients, according to another embodiment of the disclosure. More specifically, FIG. 4 illustrates an implementation of the method by the second client. The method, may be implemented using a PC, a smart mobile terminal, a smartphone and a tablet PC, a vehicle-mounted terminal, or any terminal that may bill a user based on services rendered or purchases made by audio encoding, and broadcasting the encoded audios from a first client to a second client. The method may include the following exemplary operations:

S401: The second client monitoring the computed payment charge voice message generated by a first client on a basis of a payment charge information a first client identifier which are broadcasted by the first client.

S402: The second client decoding the computed payment charge voice message to obtain the first client identifier and the pending payment charge indication information.

After the voice-based payment function has been enabled in the operation S401, a monitoring module or pick up module of the terminal may be invoked to monitor and record the computed payment charge voice message broadcasted by the first client. After the computed payment charge voice message has been recorded, the computed payment charge voice message is decoded (under the same encoding/decoding rules of the first client) to restore the pending payment charge indication information and the first client identifier.

It should be pointed out that, when the first client encodes the pending payment charge indication information and the first client identifier, the first client may set a start flag and an end flag in the encoding/decoding rules and negotiate a specific data format. This may allow the pending payment charge indication information and the first client identifier contained in the computed payment charge voice message to be obtained accurately according to the start flag, the end flag, and the data format in the operation S402.

S403: The second client generating a payment request and sending the payment request to a server, wherein the payment request includes the pending payment charge indication information, the first client identifier and payer information, so that the server may initiate the payment transaction process in order to complete the funds transfer from the paying account corresponding to the payer information to the receiving account corresponding to the first client identifier.

The second client may be considered to have obtained an order for the current payment transaction once it obtains the pending payment charge indication information and the first client identifier. The first client identifier may be a payee identifier, and information about the account of the payee corresponding to the identifier may be obtained according to the first client identifier.

The payer information may be a user account, for example, a bank credit card number, Internet transaction account, or even a mobile number that may be used to complete Internet-based payment, of the user who initiates the purchase. In addition, the payer information may further contain a password for the corresponding user account, allowing the server to directly authenticate whether the user is legitimate or legal. Of course, the payer information may also be merely a user account. Based on the user account, the server may initiate the transaction process from user authentication until completion of funds transfer.

The following illustrates in details the payment-related devices and payment system described in the embodiments of the present disclosure.

Figure 5:
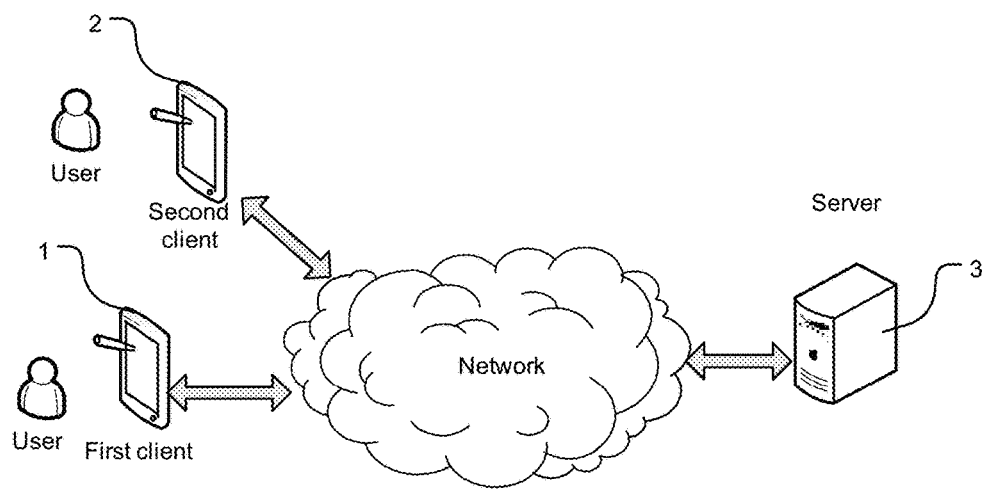
FIG. 5 depicts a block diagram of an exemplary payment system, according to an embodiment of the disclosure.

FIG. 5 depicts a block diagram of an exemplary payment system, according to an embodiment of the disclosure. The system may include at least a first client (1), a second client (2), and a server (3), wherein: a first client being a payee who receives payment and a second client being a payer who makes the payment.

More specifically, the first client (1) may perform audio encoding on: the obtained pending payment charge indication information and the first client identifier in order to obtain a computed payment charge voice message and subsequently broadcast the computed payment charge voice message.

The second client (2) may monitor the computed payment charge voice message and decode the computed payment charge voice message in order to obtain the pending payment charge indication information and the first client identifier.

The second client (2) may further generate a payment request containing the pending payment charge indication information, the first client identifier and the payer information and send the payment request to the request to the server.

The server (3) may respond to the payment request and initiate the payment transaction process in order to complete funds transfer from the paying account corresponding to the payer information to the receiving account corresponding to the first client identifier.

The first client (1) may be a PC, a smart mobile terminal, such as a smartphone and a tablet PC, a vehicle-mounted terminal, or any other terminal with a connection to a network and is enabled to bill a user for services rendered or goods purchased. The first client (1) is also enabled to encode the payment charge information and broadcast the encoded payment charge information as audios signals.

In an embodiment, the first client (1) may be directly configured with a billing program to obtain the pending payment charge indication information. For example, the pending payment charge indication information may be obtained based on an itemized list with names of services rendered or names of goods purchased, unit price, and quantities, etc.

The pending payment charge information may also be obtained by using an existing billing program or a barcode-based method. The pending payment charge indication information may be a taxi bill calculated by a taximeter based on the unit price and mileage driven. In addition, the first client (1) may directly read related payment charge indication information from various existing billing devices through an interface provided by an application, such as a preconfigured billing program and a billing program used in a taxi.

After obtaining payment charge indication information, the first client may perform according to a preset encoding/decoding rules, audio encoding on: the obtained pending payment charge indication information and the preset first client identifier (which uniquely identifies the first client (1)) in order to obtain the computed payment charge voice message. Upon completion of encoding, the first client may invoke the audio broadcast module to broadcast the encoded computed payment charge voice message.

The second client (2) may be a smart mobile terminal with networking capabilities, such as a smartphone, a tablet PC, and a smart wearable device. After the voice-based payment function may be enabled, the second client (2) may invoke a pickup module of the mobile terminal to monitor and record the computed payment charge voice message broadcasted by the first client (1).

After recording computed payment charge voice message, the second client (2), may decode (according to the same encoding/decoding rules of the first client (1)) the computed payment charge voice message to restore the pending payment charge indication information and the first client identifier.

The first client (1) in encoding the pending payment charge indication information and the first client identifier, may set a start flag and an end flag according to the encoding/decoding rules, and negotiate a specific data format. Such rules (i.e., according to the start flag, the end flag, and the data format) may allow the second client (2) to accurately obtain the pending payment charge indication information and the first client identifier contained in the computed payment charge voice message.

It may be considered that the second client (2) has obtained an order for the current payment transaction, once it obtains the pending payment charge indication information and the first client identifier. The first client identifier may be a payee identifier which is according to the first client identifier. Information about the account of the payee corresponding to the identifier may be obtained.

The payer information may be a user account, such as a bank credit card number, an Internet transaction account, and even a mobile number that may be used to complete Internet-based payment of the payer who initiates the purchase. In addition, the payer information may further contain a password for the corresponding user account, allowing the server to directly authenticate whether the user is legal or legitimate. The payer information may also be merely a user account. Based on the user account, the server (3) may initiate the flow from user authentication up to completion of the funds transfer.

The server (3) may be a communication server used to complete the communication between the first client (1) and the second client (2). Upon receiving a payment request from the second client (2), the server (3) may send a payment request to preset transaction servers corresponding to the account type based on the account type specified in the payer information contained in the payment request.

Based on the pending payment charge indication information, the first client identifier, and the payer information contained in the payment request, respective transaction servers may obtain an order to complete the existing transaction payment according to the order. Upon completion of the transaction, the respective transaction servers may return a transaction success or failure notification to the server (3).

Alternately, the server (3) may also be an integrated server that may implement transaction payment. The server (3) may directly perform the current funds transfer from the paying account corresponding to the payer information to the receiving account corresponding to the first client identifier.

In an embodiment, the first client (1) may utilize payment charge information read from a billing device as the pending payment charge indication information, to perform audio encoding on: the payment charge information (as the pending payment charge indication information) and the first client identifier (which has been preset) in order to obtain the computed payment charge voice message, and invoke a broadcasting device to broadcast the computed payment charge voice message.

Alternatively, the first client (1) may send the obtained pending payment charge indication information to the server (3) and receive from the server (3), the generated billing identifier based on the bill information. The first client (1) may use the payment charge information (as the pending payment charge indication information) and the first client identifier to obtain the computed payment charge voice message; and invoke a broadcasting device to broadcast the computed payment charge voice message.

Optionally, the second client (2) may further be used to display the pending payment charge indication information and/or the first client identifier obtained through decoding on a preset bill display interface.

After obtaining the corresponding payment charge indication information and the first client identifier obtained through decoding, the second client may display the pending payment charge indication information and the first client identifier, requesting the user to confirm whether the information is correct and a confirmation to execute the current transaction payment.

If it has been detected that there is a confirmation of payment operation, the second client (2) may initiate the payment transaction process. Otherwise, the second client (2) may directly delete the recorded payment voice message and the pending payment charge indication information and the first client identifier after the decoding.

Optionally, the server (3) may further be used to, upon detecting a completion of funds transfer, send a transaction confirmation notification to the first client (1) and the second client (2).

Optionally, the server (3) may further be used to, upon detecting completion of funds transfer, store the first client identifier, the pending payment charge indication information, and the payer information.

The server (3) may upon receiving a query request that is based on the payer information, search for the terminal (i.e., the second client) which sends the query request, and return the first client identifier and the pending payment charge indication information to the terminal (i.e., second client).

The server (3) may further upon receiving an invoice printing request based on payer information from an invoice printing device, query the corresponding payment charge indication information and the first client identifier based on the payer information contained in the invoice printing request, and return an invoice data message to the printing device that sends the invoice printing request to print the corresponding invoice.

Figure 6:
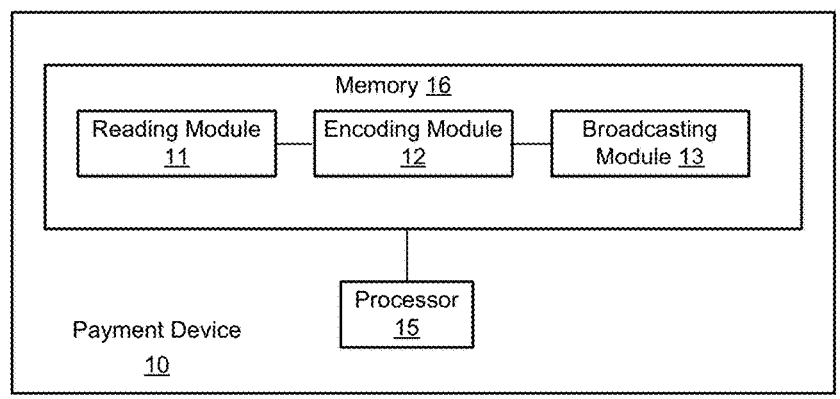
FIG. 6 depicts a block diagram of an exemplary payment device, according to an embodiment of the disclosure.

FIG. 6 depicts a block diagram of an exemplary payment device, according to an embodiment of the disclosure. The payment device (10) may include: at least a processor (15) operating in conjunction with at least a memory (15) which stores instruction codes operable as plurality of modules, wherein the plurality of modules may include: a reading module (11), an encoding module (12) and a broadcasting module (13).

The reading module (11) may obtain payment charge indication information. The encoding module (12) may perform audio encoding on: the obtained payment charge indication information and a preset first client identifier (which identifies the first client) in order to obtain a computed payment charge voice message. The broadcasting module (13) may broadcast the computed payment charge voice message to the second client, so that the second client may send a payment request to a server based on the computed payment charge voice message to complete funds transfer.

Figure 7:
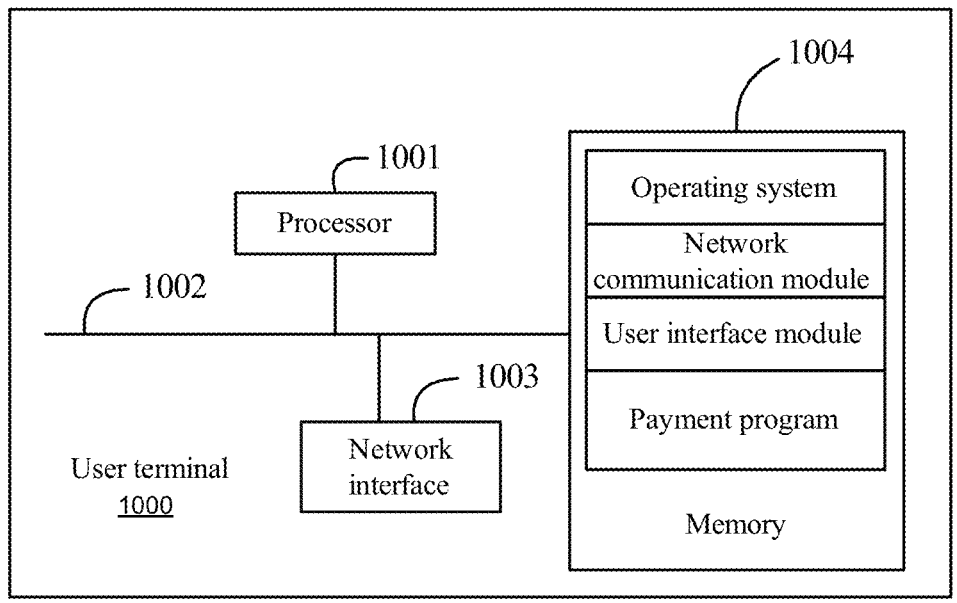
FIG. 7 depicts a block diagram of an exemplary user terminal, according to an embodiment of the disclosure.

The payment device (10) may be implemented as a PC, a smart mobile terminal, such as a smartphone and a tablet PC, a vehicle-mounted terminal, or any other terminal that may connect to a network and be able to generate a bill (or payment charge information) to a customer client based on services rendered and goods purchased. The payment device (10) may encode and broadcast the encoded payment charge information in audio formats. Specifically, the payment device may be implemented as the first client 1. The device comprises:

FIG. 7 depicts a block diagram of an exemplary user terminal (1000), according to an embodiment of the disclosure. The user terminal (1000) may include at least one processor (1001), which may be a CPU, at least one communication bus (1002), at least one network interface (1003), and at least one memory (1004).

The communication bus (1002) may be used to complete a communication connection among the above-mentioned first, second clients and the server, respectively. Optionally, the network interface (1003) may be a standard wired interface or wireless interface, such as a WIFI interface and a mobile communication interface. The memory (1004) may be a high-speed random access memory (RAM) or a non-volatile memory, such as at least one disk storage module. Optionally, the memory (1004) may also be at least one storage device located away from the above-mentioned processor (1001). As shown in FIG. 7, the memory (1004) may be a non-transitory computer storage medium, which stores an operating system, network communication module, and programs including a payment program.

Specifically, the processor (1001) may be used to invoke a program stored in the memory 1004 for implementing payment and execute the following steps: obtaining payment charge indication information; performing audio encoding of the obtained payment charge indication information and the first client identifier which has been preset, in order to obtain the computed payment charge voice message; and broadcasting the computed payment charge voice message to the second client so that the second client sends a payment request to a server based on the computed payment charge voice message to complete the funds transfer.

Figure 8:
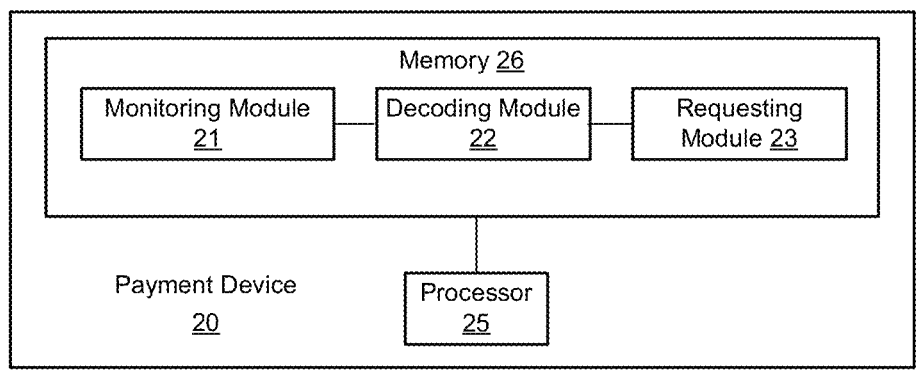
FIG. 8 depicts a block diagram of an exemplary payment device, according to another embodiment of the disclosure.

FIG. 8 depicts a block diagram of an exemplary payment device (20), according to another embodiment of the disclosure. The device (20) may be implemented on a PC, a smart mobile terminal, such as a smartphone and a tablet PC, a vehicle-mounted terminal, or any other terminal that may bill a user based on services rendered and goods purchased, and may encode and broadcast the encoded payment charge information in audio formats. The payment device (20) may be implemented as the second client.

The payment device (20) may include at least a processor operating in conjunction with at least a memory which stores instruction codes operable as plurality of modules, wherein the plurality of modules include: a monitor module (21), a decoding module (22), and a requesting module (23).

The monitoring module (21) may monitor the computed payment charge voice message generated and broadcasted by the first client based on the pending payment charge indication information and first client identifier.

The decode module (22) may decode the computed payment charge voice message to obtain the pending payment charge indication information and the first client identifier.

The request module (23) may generate a payment request containing payment charge indication information, the first client identifier, and the payer information and send the payment request to a server so that the server may initiate the payment transaction process in order to complete funds transfer from the paying account corresponding to the payer information to the receiving account corresponding to the first client identifier.

The billing device may be a billing module built in a first client or as an external billing module, for example, a taximeter, a cash register computer, and a billing device in a bus. The first client reads the corresponding payment charge indication information through information exchange.

After obtaining payment charge indication information, the first client may perform (according to the preset encoding/decoding rules) audio encoding of the obtained pending payment charge indication information and the preset first client identifier, and obtains the computed payment charge voice message. Upon completion of encoding, the first client may invoke the audio broadcast module to broadcast the computed payment charge voice message obtained through encoding.

Figure 9:
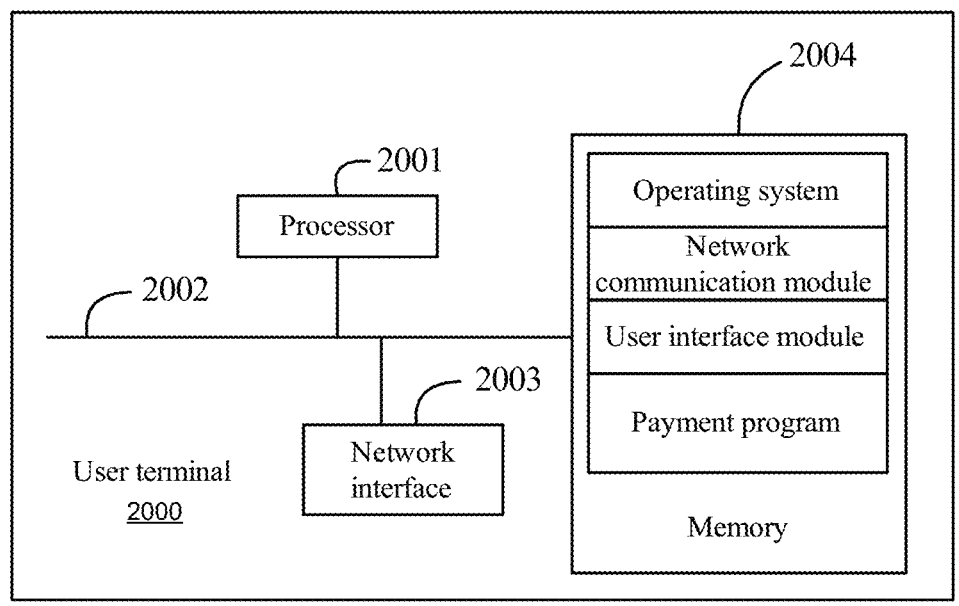
FIG. 9 depicts a block diagram of an exemplary user terminal, according to another embodiment of the disclosure.

FIG. 9 depicts a block diagram of an exemplary user terminal, according to another embodiment of the disclosure. The user terminal may include at least one processor (2001) such as a CPU, at least one communication bus (2002), at least one network interface (2003), and at least one memory (2004).

The communication bus (2002) may be used to complete a communication the connection among the above-mentioned clients and the server. The network interface (2003) may optionally be a standard wired interface or wireless interface, such as a WIFI interface and mobile communication interface. The memory (2004) may be a high-speed RAM or a nonvolatile memory, for example, at least one disk storage module. The memory (2004) optionally may also be at least one storage device located away from the above-mentioned processor (2001). As shown in FIG. 9, the memory (2004) may be a non-transitory computer storage medium, which stores an operating system, a network communication module, and programs including a payment program.

Specifically, the processor (2001) may be used to invoke the program stored in the memory (2004) for implementing payment and execute the following steps: monitoring the computed payment charge voice message generated by the first client based on the pending payment charge indication information and the first client identifier obtained and broadcasted by the first client; decoding the computed payment charge voice message to obtain payment charge indication information and the first client identifier; generating a payment request containing payment charge indication information, the first client identifier, and payer information and sending the request to a server so that the server initiates the payment transaction process in order to complete the funds transfer from the paying account corresponding to the payer information to the receiving account corresponding to the first client identifier.

It may be seen in the above described various embodiments, using clients supporting audio broadcasting and audio recording which are implemented through using mobile phones carried by the payer and payee, may complete payment of bills between the receiving side and the paying side conveniently, swiftly, and in low costs. In addition, client-based payments may be implemented directly on existing billing devices, without significantly changing the existing payment mode, and reducing retooling costs of install new payment infrastructure.

It should be understood by those with ordinary skill in the art that all or some of the steps of the foregoing embodiments may be implemented by hardware, or software program codes stored on a non-transitory computer-readable storage medium with computer-executable commands stored within. For example, the disclosure may be implemented as an algorithm as codes stored in a program module or a system with multi-program-modules. The computer-readable storage medium may be, for example, nonvolatile memory such as compact disc, hard drive. ROM or flash memory.

The foregoing represents only some preferred embodiments of the present disclosure and their disclosure may not be construed to limit the present disclosure in any way. Those of ordinary skill in the art will recognize that equivalent embodiments may be created via slight alterations and modifications using the technical content disclosed above without departing from the scope of the technical solution of the present disclosure, and such summary alterations, equivalent has changed and modifications of the foregoing embodiments are to be viewed as being within the scope of the technical solution of the present disclosure.

What is claimed is:

1. A method of completing payment through clients, wherein:

the clients comprise at least a first client being a payee who receives a payment and a second client being a payer who makes the payment, the method comprising performing in a sequential order, under respective control of respective processor and software codes to configure relevant circuitry in each respective client, the following steps:

audio encoding by a first mobile device of the first client on: a first client identifier and obtained pending payment charge indication information in order to obtain a computed payment charge voice message, wherein the payment charge voice message is encoded with a start flag, an end flag and a specific data format to allow the second mobile device of the second client to obtain the pending payment charge indication information and the first client identifier for accurate payment indication in an internet-based payment transaction;

afterwards, directly broadcasting by the first mobile device of the first client, the computed payment charge voice message to a second mobile device of the second client, monitoring and subsequently decoding by the second mobile device of the second client, the computed payment charge voice message which is directly received from the first mobile device of the first client in order to extract the first identifier and the pending payment charge indication information;

generating by the second mobile device of the second client, a payment request and sending the payment request to a server to start processing the internet-based payment transaction according to the start flag, the end flag and the specific data format, wherein the payment request comprises the first identifier, the pending payment charge indication information and payer information; and initiating by the server in response to the received payment request from the second mobile device of the second client, the internet-based payment transaction process in order to complete funds transfer between a payer account corresponding to the payer information of the second client and a payee account corresponding to the first client identifier and according to the start flag, the end flag and the specific data format, such that the funds transfer is completed accurately and directly between the first mobile device and the second mobile device through the payment charge voice message.

2. The method according to claim 1, wherein the audio encoding by the first client on: the first client identifier and the obtained pending payment charge indication information in order to obtain the computed payment charge voice message, and subsequently broadcasting the computed payment charge voice message, comprising the first mobile device of the first client:

utilizing payment charge information read from a billing device to obtain the obtained pending payment charge indication information;

performing the audio encoding on: both the payment charge information which forms the pending payment charge indication information and the first client identifier which has been preset, in order to obtain the computed payment charge voice message; and invoking a broadcasting device to broadcast the computed payment charge voice message.

3. The method according to claim 2, wherein the audio encoding by the first client on: the first client identifier and the obtained pending payment charge indication information in order to obtain the computed payment charge voice message, and subsequently broadcasting the computed payment charge voice message, comprising the first mobile device of the first client:

sending the payment charge information to the server;

receiving a billing identifier generated by the server based on the payment charge information;

setting the generated billing identifier as the pending payment charge indication information, and performing audio encoding on: both the generated billing identifier which is being used as the pending payment charge indication information and the first client identifier which has been preset, in order to obtain the computed payment charge voice message; and invoking the broadcasting device to broadcast the computed payment charge voice message.

4. The method according to claim 3, wherein the initiating of the payment transaction process by the server in response to the received payment request, comprising:

the server obtaining the generated billing identifier based on the pending payment charge indication information which is contained in the payment request;

the server searching for the payment charge information which is associated with the billing identifier and has been stored; and the server initiating the payment transaction process based on the found payment charge information and the payment request which contains the first client identifier and the payer information.

5. The method according to claim 1, wherein, prior to the second client generating the payment request and sending the payment request to the server, the method further comprising:

the second mobile device of the second client displaying on a preset payment charge interface, one or both of: the pending payment charge indication information and the first client identifier which are obtained from the decoding; and upon detecting a confirmation of the payment transaction process, the second mobile device of second client performing the generating of the payment request which comprises the first identifier, the pending payment charge indication information and payer information, and subsequently sending the payment request to the server.

6. The method according to claim 1, further comprising:

upon detecting a completion of the funds transfer, the server sending a transaction confirmation notification to the first mobile device of first client and the second mobile device of the second client.

7. The method according to claim 1, further comprising:

upon detecting a completion of the funds transfer, the server storing the first client identifier, payment charge indication information, and payer information;

upon receiving a query request that is based on the payer information, the server searching for a terminal of the payer, which the terminal of the payer sends the query request, and returning the first client identifier and the payment charge indication information to the terminal of the payer; and upon receiving an invoice printing request based on the payer information from an invoice printing device, the server querying the corresponding payment charge indication information and the first client identifier based on the payer information which are contained in the invoice printing request, and returning an invoice data message to the printing device that sends the invoice printing request in order to print a corresponding invoice.

8. A payment device for use between at least a first mobile device of a first client and a second mobile device of a second client, the first client being a payee who receives payment and the second client being a payer who makes the payment, the payment device comprises:

at least a processor executes instruction codes stored in at least a non-transitory memory, which configures relevant circuitry in the payment device to operate in a sequential order, the following steps:

obtain payment charge indication information;

perform audio encoding on: the obtained payment charge indication information and a preset first client identifier which identifies the first client, in order to obtain a computed payment charge voice message, wherein the payment charge voice message is encoded with a start flag, an end flag and a specific data format to allow the second mobile device of the second client to obtain the pending payment charge indication information and the first client identifier for accurate payment indication in an internet-based payment transaction; and afterwards, the first mobile device directly broadcasts the computed payment charge voice message to the second client for decoding the received computed payment charge voice message so that the second client subsequently sends a payment request to a server based on the received computed payment charge voice message to start processing and to complete funds transfer in the internet-based payment transaction, and according to the start flag, the end flag and the specific data format, such that the funds transfer is completed accurately and directly between the first mobile device and the second mobile device through the payment charge voice message.

9. A payment system, which comprises at least a first mobile device of a first client being a payee who receives payment, a second mobile device of a second client being a payer who makes the payment and a server, wherein the system performs in sequential order, under respective control of respective processor and software codes to configure relevant circuitry in each respective mobile device, the following steps:

the first mobile device of the first client performs audio encoding on: both obtained pending payment charge indication information and a first client identifier in order to obtain a computed payment charge voice message, and broadcasts the computed payment charge voice message, wherein the payment charge voice message is encoded with a start flag, an end flag and a specific data format to allow the second mobile device of the second client to obtain the pending payment charge indication information and the first client identifier for accurate payment indication in an internet-based payment transaction;

afterwards, the first mobile device directly broadcasts the computed payment charge voice message to the second mobile device of the second client, the second mobile device of the second client monitors and subsequently decodes the computed payment charge voice message which is directly received from the first mobile device of the first client in order to obtain the pending payment charge indication information and the first client identifier;

the second mobile device of the second client further generates a payment request which contains the pending payment charge indication information, the first client identifier and payer information, and sends the payment request to the server to start processing the internet-based payment transaction according to the start flag, the end flag and the specific data format; and the server, in response to the received payment request from the second mobile device, initiates a payment transaction process in order to complete funds transfer between a payer account corresponding to the payer information and a payee account corresponding to the first client identifier and according to the start flag, the end flag and the specific data format, such that the funds transfer is completed accurately and directly between the first mobile device and the second mobile device through the payment charge voice message.

10. The system according to claim 9, wherein the first mobile device of the first client:

utilizes the payment charge information from the pending payment charge indication information which is read from a billing device in order to perform audio encoding on: both the payment charge information from the pending payment charge indication information and the first client identifier which has been preset, in order to obtain the computed payment charge voice message, and invokes a broadcasting device to broadcast the computed payment charge voice message.

11. The system according to claim 9, wherein the first mobile device of the first client:

sends the obtained pending payment charge indication information to the server;

receives a billing identifier generated by the server which is based on the payment charge information;

utilizes the payment charge information from the pending payment charge indication information;

performs audio encoding on: both the payment charge information from the pending payment charge indication information and the first client identifier which has been preset, in order to obtain the computed payment charge voice message; and invokes a broadcasting device to broadcast the computed payment charge voice message.

12. The system according to claim 9, wherein:

the second mobile device of the second client displays on a preset payment charge display interface, one or both of: the pending payment charge indication information and the first client identifier which are obtained through the decoding.

13. The system according to claim 9, wherein:

the server upon detecting completion of the funds transfer, sends a transaction confirmation notification to the first client and the second client.

14. The system according to claim 9, wherein the server:

detects completion of the funds transfer, stores the first client identifier, payment charge indication information and the payer information;

upon receiving a query request which is based on the payer information, searches for a terminal of the payer, which the terminal of the payer sends the query request, and returns the first client identifier and the payment charge indication information to the terminal of the payer; and upon receiving an invoice printing request based on the payer information from an invoice printing device, the server queries the corresponding payment charge indication information and the first client identifier based on the payer information which are contained in the invoice printing request, and returns an invoice data message to the printing device that sends the invoice printing request in order to print a corresponding invoice.

* * * * *